Aug. 28, 1951 W. E. WITHALL 2,565,672
SHOCK ABSORBER FOR RAILWAY CAR TRUCKS
Filed Oct. 10, 1949
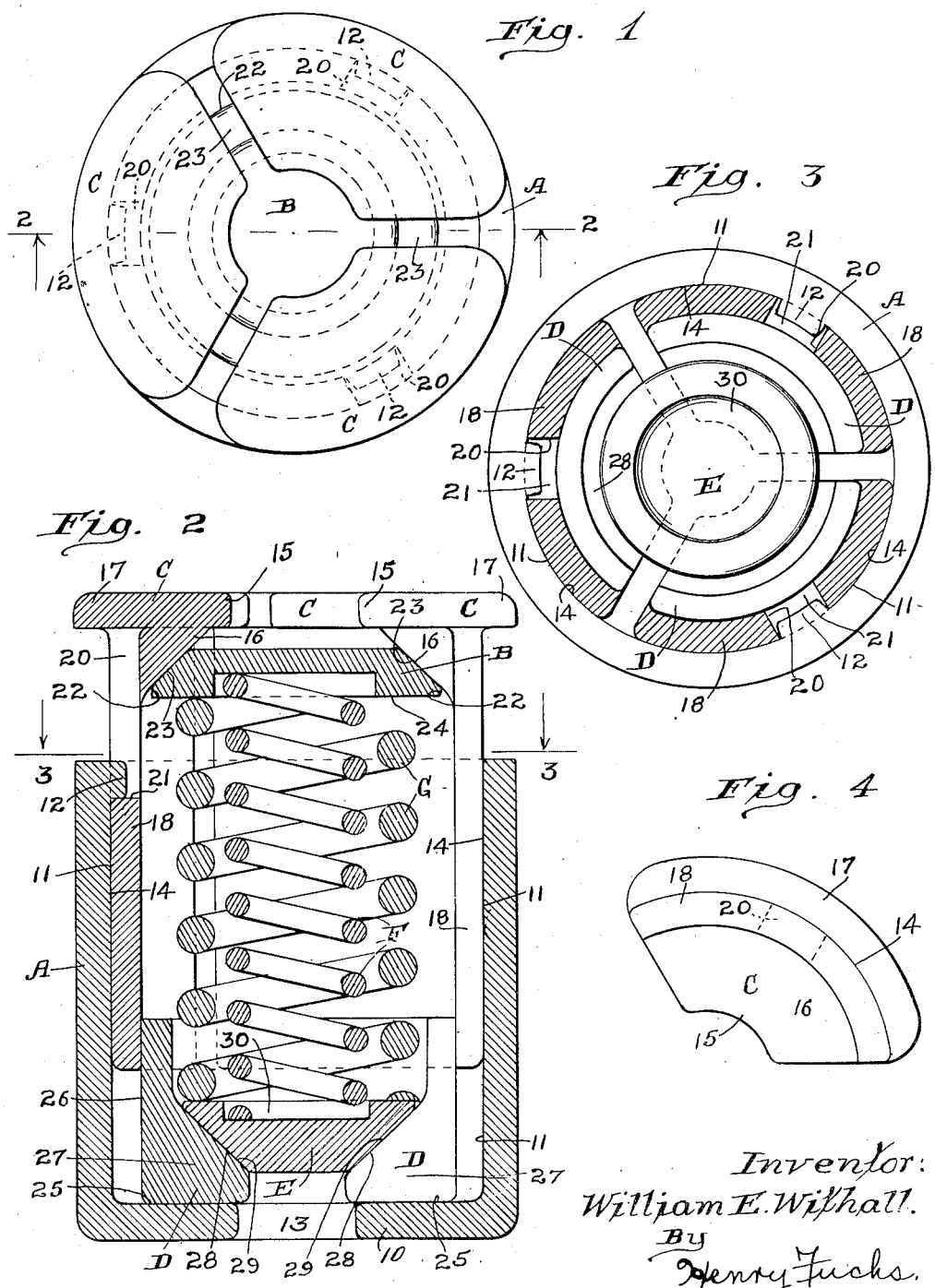
Inventor:
William E. Withall.
By Henry Fuchs.
Atty.

Patented Aug. 28, 1951

2,565,672

UNITED STATES PATENT OFFICE 2,565,672

SHOCK ABSORBER FOR RAILWAY CAR TRUCKS

William E. Withall, Hinsdale, Ill., assignor to W. H. Miner, Inc., Chicago, Ill., a corporation of Delaware Application October 10, 1949, Serial No. 120,557

2 Claims. (Cl. 267—9)

This invention relates to improvements in friction shock absorbers for snubbing the action of truck springs of railway cars.

One object of the invention is to provide a friction shock absorber for snubbing the action of railway car truck springs, comprising a friction casing, elongated friction shoes slidingly telescoped within the casing, a wedge element engaging the shoes near their outer ends to spread the same apart, and a spring within the casing yieldingly opposing inward movement of the wedge element and shoes, wherein means is provided in the form of an expandible clutch, cooperating with the inner ends of the shoes for spreading the same apart, thereby preventing inward tilting of the inner end portions of the shoes during operation of the mechanism.

A further object of the invention is to provide a mechanism as set forth in the preceding paragraph, wherein the expandible clutch comprises a plurality of relatively short friction shoes in engagement with the inner sides of the elongated shoes, and a central wedge block in wedging engagement with the short friction shoes, wherein the spring, which yieldingly opposes inward movement of the wedge element and elongated shoes, also actuates the wedge block of the clutch.

Other objects of the invention will more clearly appear from the description and claims hereinafter following.

In the accompanying drawing forming a part of this specification, Figure 1 is a top plan view of my improved shock absorber. Figure 2 is a transverse, vertical sectional view, corresponding substantially to the line 2—2 of Figure 1. Figure 3 is a horizontal sectional view, corresponding substantially to the line 3—3 of Figure 2. Figure 4 is a bottom plan view of one of the friction shoes of the improved shock absorber.

As shown in the drawing, my improved shock absorber comprises broadly a friction casing A, a wedge element B, three elongated friction shoes C—C—C, three short friction shoes D—D—D, a wedge block E, an inner spring F, and an outer spring G.

The casing A is in the form of a tubular member of cylindrical, transverse cross section, open at its top end and having a transverse wall 10 at its bottom end. The casing presents lengthwise extending, transversely curved, interior friction surfaces 11—11—11 with which the three shoes C—C—C cooperate, respectively. At the open upper end thereof, the casing A has three circumferentially spaced, laterally inwardly projecting stop lugs 12—12—12, each lug being located midway of the width of the corresponding friction surface 11. The bottom wall 10 of the casing is provided with a central opening 13, adapted to receive the usual spring centering lug of the lower spring plate of a truck spring cluster.

The three friction shoes C—C—C are of similar design and are arranged symmetrically about the central, vertical axis of the mechanism. Each shoe is of curved, transverse cross section, presenting a longitudinally extending, transversely curved friction surface 14 on its outer side slidingly engaged with the corresponding friction surface 11 of the casing. Each shoe has an inwardly projecting, relatively heavy, horizontal flange 15 at its upper end, provided with a downwardly facing wedge face 16 on its underneath side. Each shoe C further has a laterally outwardly projecting flange 17 at its upper end, which overhangs the wall of the casing A and is engageable with the upper end of said casing to limit downward movement of the shoe. The inner side of each shoe C, below the wedge face 16, presents a lengthwise extending, transversely curved friction surface 18 with which one of the short shoes D is engaged. Each shoe C is centrally slotted lengthwise, as indicated at 20, to accommodate the corresponding lug 12 of the casing, said slot extending downwardly from the flange 17 of the shoe to a point above the mid section of the same, thereby providing a horizontal stop shoulder 21 engageable with the corresponding lug 12 to limit outward movement of said shoe.

The wedge element B is in the form of a heavy disc having a depending peripheral flange 22. The wedge element B has an upwardly facing, annular wedge face 23 in wedging engagement with the wedge faces 16—16—16 of the shoes C—C—C. The lower end of the flange 22 presents a horizontal abutment face 24 for the upper end of the spring G.

The short shoes D are arranged within the bottom portion of the casing A. The shoes D are three in number and cooperate, respectively, with the shoes C. The shoes D—D—D are supported on the bottom wall 10 of the casing, each shoe presenting a flat bottom end face 25 bearing on said wall. On the outer side, each shoe D has a lengthwise extending, transversely curved friction surface 26, which is engaged with the friction surface 18 on the inner side of the corresponding shoe C. Each shoe D is laterally inwardly enlarged at its lower end, as indicated at 27, and said enlargement 27 is provided with an upwardly facing, transversely curved wedge face 28. As shown most clearly in Figure 2, the shoes D—D—D overlay the lower ends of the shoes C—C—C in the normal fully expanded condition of the mechanism, with the lower ends of the shoes C—C—C spaced above the wall 10 of the casing A. The distance between the bottom ends of the shoes C—C—C and the wall 10 is at least as great as the distance between the flanges 17—17—17 of the shoes C—C—C and the top end of the casing A.

The wedge block E is of frusto-conical shape, having a downwardly converging, annular wedge face 29 on its outer side, engaging the wedge faces 28—28—28 of the three shoes D—D—D. The upper end face of the block E is centrally recessed to provide a seat 30 for the bottom end of the inner spring F.

The inner spring F is in the form of a helical coil bearing at its upper end on the wedge element B interiorly of the annular flange 22, and having its lower end engaged in the seat 30 of the wedge block E.

The outer spring G, which is also in the form of a helical coil, is heavier than the spring F and surrounds the latter. The spring G has its top and bottom ends bearing, respectively, on the flat face 24 of the wedge element B and the upper side of the wedge block E.

The springs F and G are both under initial compression, thereby forcing the wedge element B against the wedge faces of the shoes C—C—C, and the wedge block E against the wedge faces of the shoes D—D—D. The wedge element B thus spreads the shoes apart at their upper ends into frictional engagement with the casing A, while the wedge block E spreads the shoes D—D—D apart against the lower end portions of the shoes C—C—C, the wedge block E, together with the shoes D—D—D, thus forming an expandible clutch which acts on the lower end portions of the shoes C—C—C to spread said shoes apart at their lower ends and into tight frictional engagement with the casing A, thus overcoming any tendency for the lower ends of the shoes to be tilted inwardly, which would otherwise occur if the wedge element B alone were relied upon to spread the shoes apart.

In assembling the mechanism, the shoes C—C—C, wedge element B, shoes D—D—D, wedge block E, and the springs F and G, in assembled condition, as a unit, are inserted within the casing through the upper end thereof, this unit being held circumferentially contracted to permit the shoes C—C—C to pass between the lugs 12—12—12 of the casing A. After the shoes have been engaged between the lugs 12—12—12, the assembled unit is forced downwardly into the casing until the lugs 12—12—12 snap into the slots 20—20—20 of the shoes in back of the shoulders 21—21—21.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the shoes C—C—C are forced downwardly with respect to the casing A, against the spring resisted wedge element B. The shoes C—C—C are thus spread apart by the pressure of the springs F and G on the wedge element B and on the clutch, comprising the wedge block E and the shoes D—D—D. The desired frictional resistance is thus provided between the shoes C—C—C and the casing A, and between the shoes C—C—C and the shoes D—D—D to snub the action of the truck springs. Upon recoil of the truck springs and upward movement of the top spring plate of the truck spring cluster, the springs F and G return all of the parts to the normal full released positions, as shown in Figure 2, outward movement of the shoes being limited by engagement of the stop shoulders 21 thereof with the stop lugs 12 of the casing A.

I claim:

1. In a friction shock absorber, the combination with a friction casing open at its upper end and having a transverse wall at its bottom end; of a set of friction shoes buttressed against said bottom wall; a second set of friction shoes slidingly telescoped within the casing, said second set of shoes surrounding said first named set and being in sliding frictional contact with the latter, said first named set of shoes having downwardly facing, interior wedge faces at the upper ends thereof, and said second named set of shoes having upwardly facing wedge faces at the lower ends thereof; top and bottom wedges in wedging engagement with the shoes of said first and second named sets, respectively; and lengthwise extending spring means within the casing bearing at its top and bottom ends on said top and bottom wedges, respectively.

2. In a friction shock absorber, the combination with a friction casing open at its upper end and having a transverse wall at its bottom end; of a set of three friction shoes buttressed against said bottom wall; a second set of three friction shoes slidingly telescoped within the casing, said second set of shoes surrounding said first named set and being in sliding frictional contact with the latter, said first named set of shoes having downwardly facing, interior wedge faces at the upper ends thereof, and said second named set of shoes having upwardly facing wedge faces at the lower ends thereof; top and bottom wedges in wedging engagement with the shoes of said first and second named sets, respectively; and lengthwise extending inner and outer coil springs within the casing bearing at its top and bottom ends on said top and bottom wedges, respectively.

WILLIAM E. WITHALL.

REFERENCES CITED

The following references are of record in the file of this patent:

UNITED STATES PATENTS

| Number | Name | Date |
|---|---|---|
| 756,919 | Washburn | Apr. 12, 1904 |
| 787,416 | Washburn | Apr. 18, 1905 |
| 1,290,307 | O'Connor | Jan. 7, 1919 |
| 1,320,563 | Moore | Nov. 4, 1919 |